United States Patent
Yoshida

(10) Patent No.: US 8,415,065 B2
(45) Date of Patent: Apr. 9, 2013

(54) FUEL CELL SYSTEM AND METHOD OF CONTROLLING FUEL CELL SYSTEM

(75) Inventor: Michio Yoshida, Miyoshi (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 13/321,722

(22) PCT Filed: Apr. 12, 2010

(86) PCT No.: PCT/IB2010/000786
§ 371 (c)(1),
(2), (4) Date: Nov. 21, 2011

(87) PCT Pub. No.: WO2010/136856
PCT Pub. Date: Dec. 2, 2010

(65) Prior Publication Data
US 2012/0070756 A1      Mar. 22, 2012

(30) Foreign Application Priority Data
May 25, 2009   (JP) ................................. 2009-125017

(51) Int. Cl.
*H01M 8/04*   (2006.01)
*H01M 8/00*   (2006.01)

(52) U.S. Cl.
USPC ........... 429/430; 429/443; 429/428; 429/427; 429/400

(58) Field of Classification Search ............... 429/430, 429/443, 428, 427, 400
See application file for complete search history.

(56) References Cited

U.S. PATENT DOCUMENTS
2010/0055521 A1    3/2010    Umayahara et al.

FOREIGN PATENT DOCUMENTS
| EP | 1 274 143 A2 | 1/2003 |
| JP | 2004-253220 A | 9/2004 |
| JP | 2005-100820 A | 4/2005 |
| JP | 2008-218398 A | 9/2008 |
| WO | 2008/004564 A1 | 1/2008 |

OTHER PUBLICATIONS

Office Action issued Jul. 26, 2011 in JP 2009-125017 and English translation thereof.
International Search Report and Written Opinion in PCT/IB2010/000786 mailed Aug. 5, 2010.

*Primary Examiner* — Helen O Conley
(74) *Attorney, Agent, or Firm* — Kenyon & Kenyon LLP

(57) ABSTRACT

A fuel cell system is equipped with a fuel cell, a DC/DC converter that is electrically connected to the fuel cell, and a control unit that controls the supply of a fuel gas and an oxidizing gas to the fuel cell and issues a voltage command to and drives the DC/DC converter to perform high potential avoidance control of restraining an output voltage of the fuel cell from exceeding a high potential avoidance voltage lower than an open circuit voltage. The control unit continues to drive the DC/DC converter so as to perform the high potential avoidance control for a predetermined time after stopping supplying the fuel cell with hydrogen and air in response to the inputting of a system operation stop command.

12 Claims, 4 Drawing Sheets

FUEL CELL SYSTEM AND METHOD OF CONTROLLING FUEL CELL SYSTEM

This is a 371 national phase application of PCT/IB2010/000786 filed 12 Apr. 2010, claiming priority to Japanese Patent Application No. 2009-125017 filed 25 May 2009, the contents of which are incorporated herein by reference.

BACKGROUND OF THE INVENTION

1. Field of the Invention

The invention relates to a fuel cell system and a method of controlling the fuel cell system. In particular, the invention relates to a fuel cell system that controls the output voltage of a fuel cell by means of a DC/DC converter, and a control method of the fuel cell system.

2. Description of the Related Art

A conventional fuel cell generates electric power through an electrochemical reaction of hydrogen and oxygen in air. The fuel cell is a clean electric power generation unit that does not discharge carbon dioxide, which is considered to be a cause for global warming. The fuel cell is expected as an electric power supply unit for an electric vehicle employing a motor as a motive power source.

In general, a fuel cell is constructed as a cell stack that includes a multitude of unit fuel cells, each of which generates electricity, connected in series and laminated on one another. Each of the unit fuel cells may be constructed by, for example, clamping a solid polymer electrolyte membrane between an anode-side electrode and a cathode-side electrode and then clamping this assembly between two separators, one of which has a hydrogen flow passage and the other an air flow passage formed therein.

Each of the electrodes has a catalytic layer that contacts the electrolyte membrane, and a gas diffusion layer that is formed on a surface of the catalytic layer. The catalytic layer consists mainly of carbon powder carrying a metal catalyst that includes, for example, platinum. Further, the gas diffusion layer air permeable and electrically conductive.

In unit fuel cell described above, the hydrogen supplied to the anode-side electrode discharges electrons due to an activation effect of the catalytic layer, and thereby turns into hydrogen ions (i.e., protons). The hydrogen ions permeate the electrolyte membrane, which exhibits good ion conductivity in a wet state, and move to the cathode side. Further, the electrons discharged in being turned into the hydrogen ions are taken out from the anode-side electrode of each of the unit fuel cells, collected, and output as an electric power generated by a fuel cell stack. In contrast, the oxygen in air supplied to the cathode-side electrode takes in the electrons, which have been recirculated to the cathode-side electrode of each of the unit fuel cells from outside the stack due to the activation effect of the catalytic layer, and thereby turns into oxygen ions. The oxygen ions then form an electrochemical union with the hydrogen ions that have permeated the electrolyte membrane, thereby producing water. The water thus produced is discharged, together with the air discharged from each of the unit fuel cells, from the fuel cell stack via a manifold.

It is known that when a state of an open circuit voltage (OCV) as a maximum possible output voltage is held in the fuel cell having the electric power generation function as described above, the platinum catalyst elutes and deteriorates. Thus, the supply of hydrogen and air to the fuel cell is, for example, adjusted or stopped so as to perform electric power generation operation at a voltage equal to or lower than an maximum operating voltage lower than the open circuit voltage.

In this case, in a vehicle mounted with a fuel cell system, when the operation of the fuel cell system is stopped in response to the manipulation of a switch by a user, it is conceivable to stop supplying the fuel cell with hydrogen and air, and shut down electric power equipment for converting or controlling the output voltage from the fuel cell. In such a case, even when the output voltage is controlled to a voltage equal to or lower than the maximum operating voltage lower than the open circuit voltage as described above during the operation of the system, electric power generation is continued due to the hydrogen and air remaining in the fuel cell after the stoppage of the operation of the system. As a result, there arises a problem in that the electromotive force of each unit fuel cell rises to the open circuit voltage.

For example, Japanese Patent Application Publication No. 2005-100820 (JP-A-2005-100820) describes a fuel cell system that supplies a fuel cell only with hydrogen after the termination of normal stop operation, consumes oxygen remaining on an air electrode in the fuel cell, and hence lowers the voltage of the fuel cell. This publication describes that the fuel cell can thus be prevented from being deteriorated by being left in a high-potential no-load state, and that the amount of wastefully discharged hydrogen can be reduced to avoid a deterioration in fuel consumption.

Further, Japanese Patent Application Publication No. 2008-218398 (JP-A-2008-218398) describes that an output voltage of a fuel cell is so controlled as to be held at a high potential avoidance voltage lower than an open circuit voltage through the operation of a DC/DC converter electrically connected to the fuel cell in an electric power generation stop state, in intermittently operating the fuel cell by making a changeover in the state thereof between an electric power generation operation state and an operation stop state.

However, JP-A-2005-100820 only describes that the fuel cell is supplied with only hydrogen after the stoppage of the operation of the system, the oxygen remaining in the fuel cell is consumed, and hence the voltage of the fuel cell is lowered. This publication does not give any concrete description of how to restrain the output voltage of the fuel cell from rising to the open circuit voltage due to the electric power generation occurring in consuming the remaining oxygen.

Further, JP-A-2008-218398 is effective in holding the output voltage of the fuel cell at the high potential avoidance voltage lower than the open circuit voltage during intermittent operation of the fuel cell. However, this publication does not offer any solution to the necessity of restraining the output voltage of the fuel cell from rising to the open circuit voltage after the stoppage of the operation of the system including the fuel cell.

SUMMARY OF THE INVENTION

The invention provides a fuel cell system that prevents the output voltage of a fuel cell from increasing to the open circuit voltage after operation of a system that includes the fuel cell is stopped, thereby suppressing deterioration of a catalyst in the fuel cell, and a method of controlling the fuel cell system.

A first aspect of the invention relates to a fuel cell system. This fuel cell system is equipped with a fuel cell that is supplied with a fuel gas and an oxidizing gas to generate an electric power, a DC/DC converter that is electrically connected to the fuel cell, and a control unit that controls supply of the fuel gas and the oxidizing gas to the fuel cell and issues a voltage command to and drives the DC/DC converter to execute a high potential avoidance control to restrain an output voltage of the fuel cell from exceeding a high potential avoidance voltage corresponding to the voltage command which is lower than an open circuit voltage. The control unit continues to drive the DC/DC converter to execute the high potential avoidance control for a first prescribed time period after the supply of the fuel gas and the oxidizing gas to the fuel cell is stopped in accordance with a system operation stop command.

In the aforementioned configuration, the control unit may perform control of lowering the voltage command for the DC/DC converter from a first value corresponding to the high potential avoidance voltage to a second value while performing high potential avoidance control after the system operation stop command is input to the control unit.

Further, the aforementioned configuration may further be equipped with a storage device that is charged with the electric power generated by the fuel cell, and the control unit may determine a rate of lowering the voltage command for the DC/DC converter from the first value to the second value while monitoring an electric power used to charge the storage device.

Further, the aforementioned configuration may further be equipped with a voltage sensor that detects an output voltage of the fuel cell, and the first prescribed time period may be set equal to the time between when the system operation stop command is input to the control unit and when a voltage detected by the voltage sensor starts falling from the high potential avoidance voltage corresponding to the voltage command. Further, in the aforementioned configuration, the first prescribed time period may be a preset time that is set equal to the time required until a residual oxidizing gas in the fuel cell is consumed so that the output voltage produced through electric power generation resulting from an electrochemical reaction of the residual oxidizing gas and a residual fuel gas remaining in the fuel cell does not exceed the high potential avoidance voltage after the system operation stop command is input to the control unit.

A second aspect of the invention relates to a method of controlling a fuel cell system that is equipped with a fuel cell that is supplied with a fuel gas and an oxidizing gas to generate an electric power, a DC/DC converter that is electrically connected to the fuel cell, and a control unit that controls supply of the fuel gas and the oxidizing gas to the fuel cell and issues a voltage command to and drives the DC/DC converter to execute a high potential avoidance control to restrain an output voltage of the fuel cell from exceeding a high potential avoidance voltage corresponding to the voltage command which is lower than an open circuit voltage. This method of controlling the fuel cell system includes stopping the supply of the fuel gas and the oxidizing gas to the fuel cell when a system operation stop command is input to the control unit, and continuing to drive the DC/DC converter to execute the high potential avoidance control for a first prescribed time period after the system operation stop command is input to the control unit.

According to the fuel cell system of the invention and the control method thereof, after the operation of the fuel cell system is stopped, the DC/DC converter continues to be driven, and the high potential avoidance control is thereby performed for the predetermined time to control the voltage of the fuel cell below the high potential avoidance voltage lower than the open circuit voltage. Thus, the output voltage of the fuel cell can be restrained from rising to the open circuit voltage after the stoppage of the operation of the system. As a result, the catalyst in the fuel cell can be restrained from deteriorating.

Further, in the aforementioned control method, control of lowering the voltage command for the DC/DC converter from a first value corresponding to the high potential avoidance voltage to a second value may be performed during the high potential avoidance control after the inputting of the system operation stop command to the control unit. According to the control method, electric power generation in the fuel cell can be promoted to accelerate the consumption of the remaining oxygen, and the time for driving the DC/DC converter after the stoppage of the operation of the system can be shortened. Thus, the time from a timing when the operation of the system is stopped to a timing when the DC/DC converter is shut down and a system main relay included in the fuel cell system is opened can be made short.

BRIEF DESCRIPTION OF THE DRAWINGS

The features, advantages, and technical and industrial significance of this invention will be described in the following detailed description of an example embodiment of the invention with reference to the accompanying drawings, in which like numerals denote like elements, and wherein.

DETAILED DESCRIPTION OF EMBODIMENT

The embodiment of the invention will be described hereinafter in detail with reference to the accompanying drawings. In this description, concrete shapes, materials, values, directions, and the like are examples to facilitate understanding of the invention, and may be changed in accordance with the use, purpose, specification, and the like, as appropriate.

Figure 1:
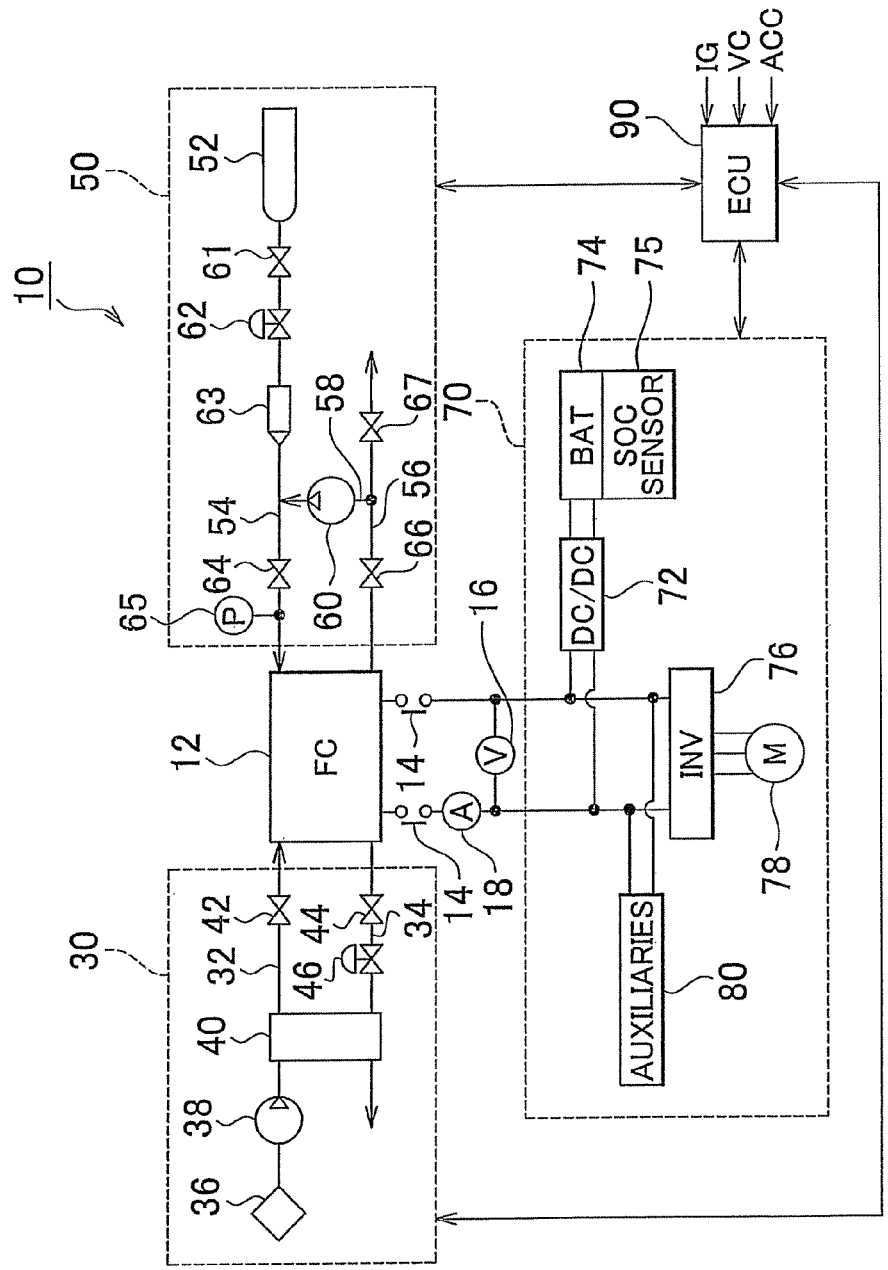
FIG. 1 is a view schematically showing an overall configuration of a fuel cell system according to an embodiment of the invention.

FIG. 1 is an overall system diagram showing an example in which a fuel cell system 10 according to an embodiment of the invention is employed as an on-vehicle electric power supply system of a fuel-cell-powered vehicle. The fuel cell system 10 includes a fuel cell stack (a fuel cell) 12 that is supplied with a fuel as and an oxidizing gas to generate electric power, an air supply system 30 for supplying the fuel cell stack 12 with oxygen in air as the oxidizing gas, a hydrogen supply system 50 for supplying the fuel cell stack 12 with hydrogen as the fuel gas, an electric power system 70 for controlling the charge/discharge of electric power to a battery 74, and an ECU (a control unit) 90 that comprehensively controls the entire fuel cell system.

The fuel cell stack 12 is a solid polymer electrolyte membrane-type cell stack having a multitude of unit fuel cells electrically connected in series to be laminated on one another. In the fuel cell stack 12, an oxidation reaction expressed as $H_2 \rightarrow 2H^+ + 2e^-$ occurs at a fuel electrode (at the anode electrode), and a reduction reaction expressed as $(\frac{1}{2})O_2 + 2H^+ + 2e^- \rightarrow H_2O$ occurs at an air electrode (at the cathode electrode). Then, in the fuel cell stack 12 as a whole, an electrochemical reaction expressed as $H_2 + (\frac{1}{2})O_2 \rightarrow H_2O$ occurs.

The fuel cell stack 12 is electrically connected to the electric power system 70 via a system main relay 14. The system main relay 14 receives a command from the ECU 90 to be controlled in an on-off manner. Further, a voltage sensor 16 for detecting the output voltage of the fuel cell stack 12 (hereinafter also referred to as "the FC voltage") and a current sensor 18 for detecting an output current of the fuel cell stack 12 (hereinafter also referred to as "the FC current") are installed on an electric power line connecting the fuel cell stack 12 to the electric power system 70.

The air supply system 30 has an air supply passage 32 through which air supplied to the air electrode of the fuel cell stack 12 flows, and an air discharge passage 34 through which air discharged from the fuel cell stack 12 flows. The air supply passage 32 is provided with an air compressor 38 that draws in ambient air via an air filter 36, a humidifier 40 for appropriately humidifying air compressed and pressurized by the air compressor 38, and a shutoff valve 42 for shutting off the supply of air to the fuel cell stack 12. The air discharge passage 34 is provided with a shutoff valve 44 for shutting off the discharge of air from the fuel cell stack 12, and a pressure regulating valve 46 for regulating the air supply pressure. Further, the air discharge passage 34 penetrates the humidifier 40, so that the water discharged together with air from the fuel cell stack 12 is collected in flowing through the humidifier 40 and then is utilized to humidify the air supplied via the air supply passage 32.

The hydrogen supply system 50 includes a hydrogen supply source 52 such as, for example, a high-pressure hydrogen tank; a hydrogen supply passage 54 through which hydrogen gas is supplied to the fuel electrode of the fuel cell stack 12 from the hydrogen supply source 52; a hydrogen discharge passage 56 through which hydrogen off gas is discharged from the fuel cell stack 12; a circulation passage 58 that branches off from the hydrogen discharge passage 56 and is connected to the hydrogen supply passage 54; and a circulation pump 60 that circulates the hydrogen off gas from the hydrogen discharge passage 56 to the hydrogen supply passage 54 through the circulation passage 58.

In the hydrogen supply passage 54 connected to the fuel cell stack 12 from the hydrogen supply source 52, a shutoff valve 61, a pressure regulating valve 62, an injector 63, a shutoff valve 64, and a pressure sensor 65 are installed, in the stated order, in the direction of the hydrogen gas supply flow. Wherein, the shutoff valve 61 shuts off the outflow of the hydrogen gas from the hydrogen supply source 52; the pressure regulating valve 62 regulates the pressure of the hydrogen gas in the hydrogen supply source 52; the injector 63 is used to regulate the amount of the hydrogen supplied to the fuel cell stack 12; the shutoff valve 64 is used to shut off the supply of the hydrogen gas to the fuel cell stack 12; and the pressure sensor 65 detects the pressure of the hydrogen gas supplied to the fuel cell stack 12. In the hydrogen discharge passage 56, a shutoff valve 66 and a hydrogen off gas discharge shutoff valve 67 are installed, in the stated order, in the direction in which the discharged hydrogen off gas flows. Wherein, the shutoff valve 66 is used to shut off the discharge of the hydrogen off gas from the fuel cell stack 12, and the hydrogen off gas discharge shutoff valve 67 is used to discharge the hydrogen off gas from the system.

Electromagnetic valves or the like that are controlled by the ECU 90 are employed as the shutoff valves 42, 44, 61, 64, 66, and 67, which are included in the air supply system 30 and the hydrogen supply system 50 respectively. Further, the pressure regulating valves 46 and 62 respectively regulate the primary pressure upstream of the pressure regulating valves 46 and 62 to a preset secondary pressure. For example, mechanical pressure reducing valves for reducing the primary pressure or the like may be employed as the pressure regulating valves 46 and 62. Furthermore, the injector 63 is an electromagnetic open/close valve that is opened/closed using an electromagnetic driving force, or the like, and adjusts the flow rate and pressure of the hydrogen gas flowing through the injector 63 via the control of the opening degree or valve open time of the valve body.

The electric power system 70 includes a DC/DC converter 72, a battery 74, an inverter 76, an alternating-current motor 78, and auxiliaries 80. The fuel cell system 10 is configured as a parallel hybrid system in which the DC/DC converter 72 and the inverter 76 are connected in parallel to the fuel cell stack 12. The DC/DC converter 72 increases the direct-current voltage supplied from the battery 74 and outputs the increased direct-current voltage to the inverter 76. The DC/DC converter 72 also decreases the direct-current electric power generated by the fuel cell stack 12 or a regenerative electric power generated by the alternating-current motor 78 through regenerative braking and charges the battery 74 with the decreased electric power. Due to the functions of the DC/DC converter 72, the charge/discharge of the battery 74 is controlled. Further, the output voltage of the DC/DC converter 72 is controlled in response to a voltage command from the ECU 90, and the operation state (the FC voltage and the FC current) of the fuel cell stack 12 is thereby controlled.

The battery 74 functions as a storage device for surplus electric power, and a regenerative energy at the time of regenerative braking. The battery 73 may also function as an energy buffer during load fluctuations resulting from acceleration or deceleration of the fuel-cell-powered vehicle. For example, a secondary battery such as a lithium secondary battery or the like is preferably employed as the battery 74. Instead of the battery, however, a capacitor, which stores an electrical charge without relying a chemical reaction, may instead be employed as the storage device. An SOC sensor 75 for detecting the state of charge (SOC) is mounted on the battery 74. More specifically, the SOC sensor 75 may be a current sensor that detects the battery current. The ECU 90 monitors the remaining capacity of the battery 74 by integrating values detected by the current sensor. Further, although not shown, the battery 74 is provided with a temperature sensor that detects the temperature of the battery 74, and outputs the detected temperature to the ECU 90.

The inverter 76 is an inverter that is driven according to, for example, a pulse width modulation control method or a rectangular wave control method. An electric power switching-element (e.g., an IGBT or the like) inside the inverter 76 is controlled in an on-off manner in accordance with a switching command from the ECU 90. The inverter 76 thereby converts a direct-current voltage output from the fuel cell stack 12 or the battery 74 into a three-phase alternating-current voltage to control the rotational torque of the alternating-current motor 78. The alternating-current motor 78 is, for example, a three-phase synchronous alternating-current motor, and constitutes a motive power source of the fuel-cell-powered vehicle.

The auxiliaries 80 generally represent respective motors (e.g., motive power sources such as pumps and the like) disposed at respective portions in the fuel cell system 10, inverters for driving these motors, and also various types of on-vehicle auxiliaries (e.g., an air compressor, an injector, a coolant circulation pump, a radiator, and the like).

The ECU 90 is a computer system equipped with a CPU, a ROM, a RAM, and an input/output interface, and controls respective portions of the fuel cell system 10. For example, upon receiving an activation signal IG output from an ignition switch (not shown), the ECU 90 starts operating the fuel cell system 10, and calculates the electric power required for the entire system based on the accelerator operation amount signal ACC output from an accelerator sensor, a vehicle speed signal VC output from a vehicle speed sensor, and the like. The electric power required for the entire system is the sum of the electric power required for the vehicle to run and that required by the auxiliaries.

In this case, the electric power for the auxiliaries includes the electric power consumed by on-vehicle auxiliaries (the air compressor, a hydrogen pump, the coolant circulation pump, and the like), devices needed to cause the vehicle to run (a transmission, a wheel control device, a steering device, a suspension device, and the like), devices disposed in a passenger space (an air conditioner, lighting fixtures, audio equipment, and the like), and the like.

The ECU 90 then sets the distribution ratio of the output electric power between the fuel cell stack 12 and the battery 74, and controls the sir supply system 30 and the hydrogen supply system 50 so that the amount of the electric power generated by the fuel cell stack 12 coincides with the amount of a target electric power. The ECU 90 also controls the DC/DC converter 72 to adjust the output voltage of the fuel cell stack 12, thereby controlling the operation state (the FC voltage and the FC current) of the fuel cell stack 12. Furthermore, the ECU 90 outputs, for example, a U-phase alternating-current voltage command value, a V-phase alternating-current voltage command value, and a W-phase alternating-current voltage command value to the inverter 76 to control the output torque and rotational speed of the alternating-current motor 78 so that a target torque corresponding to an accelerator operation amount is obtained.

Figure 2:
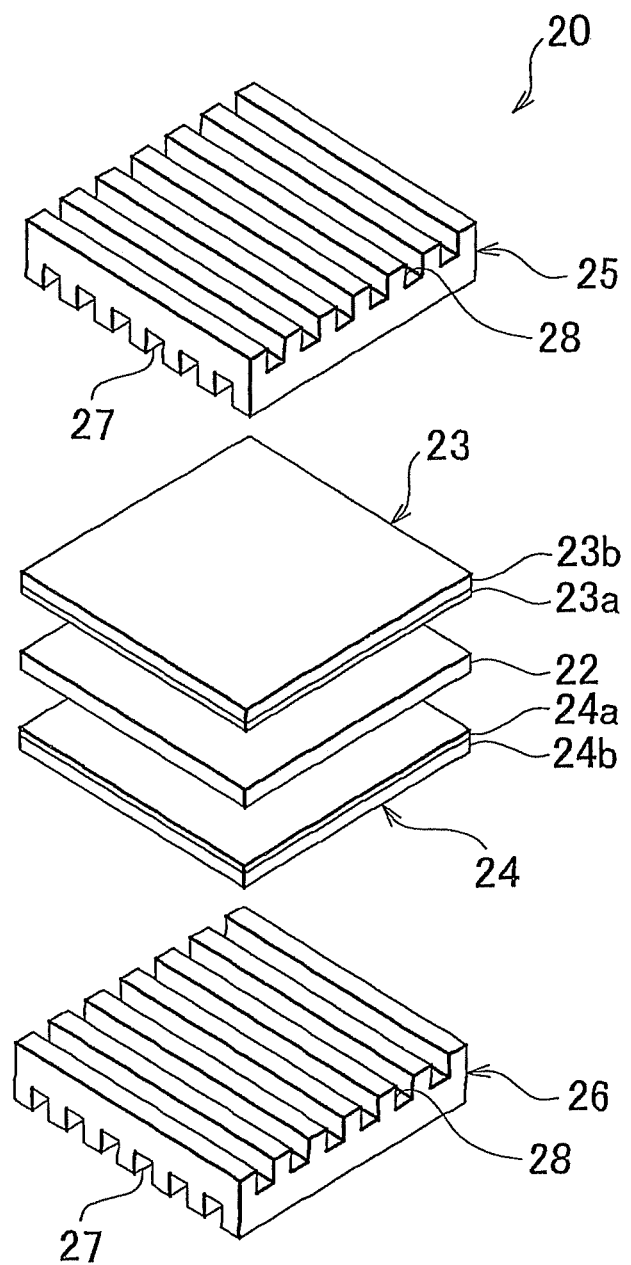
FIG. 2 is an exploded perspective view of a unit fuel cell.

FIG. 2 is an exploded perspective view of each unit fuel cell 20 constituting the fuel cell stack 12. The unit fuel cell 20 is composed of a solid polymer electrolyte membrane 22, an anode-side electrode 23, a cathode-side electrode 24, and separators 25 and 26. The anode-side electrode 23 and the cathode-side electrode 24 are diffusion electrodes that clamp the polymer electrolyte membrane 22 to establish a sandwich structure. The separators 25 and 26, which are constructed from conductive members that are non-permeable to gas, further clamp both sides of the sandwich structure to form flow passages of hydrogen and air between the anode-side electrode 23 and the cathode-side electrode 24.

A plurality of parallel grooves 27 with a concave cross-section as hydrogen flow passages are formed in the separator 25. Further, a plurality of parallel grooves 28 with a concave cross-section as air flow passages are formed in the separator 26 in a direction perpendicular to the hydrogen flow passage grooves 27. It should be noted that because each of the separators 25 and 26 is common to adjacent unit fuel cells, air flow passage grooves 28 are formed in the surface of the separator 25 opposite the side in which the hydrogen flow passages are formed, and hydrogen flow passage grooves 27 are formed in the surface of the separator 26 opposite the side in which the air flow passages are formed.

The anode-side electrode 23 is mainly made of carbon powder carrying a platinum-type metal catalyst (Pt, Pt—Fe, Pt—Cr, Pt—Ni, Pt—Ru, or the like), and has a catalytic layer 23a that contacts with the solid polymer electrolyte membrane 22, and a gas diffusion layer 23b that is formed on a surface of the catalytic layer 23a that is permeable to the air and electrically conductive. Likewise, the cathode-side electrode 24 has a catalytic layer 24a and a gas diffusion layer 24b. For example, the catalytic layers 23a and 24a are each formed by diffusing carbon powder carrying platinum or an alloy of platinum and another metal in an organic solvent, adding an electrolyte solution thereto to make the mixture pasty, and screen-printing the resulting mixture on the polymer electrolyte membrane 22. Further, the gas diffusion layers 23b and 24b may be formed of carbon felt, carbon paper, or carbon cloth woven from carbon fiber threads. The polymer electrolyte membrane 22 is an ion exchange membrane that exhibits proton conductivity, which is formed of a solid polymer material such as fluororesin, and exhibits good electric conductivity when moist.

Next, the operation of the fuel cell system 10 configured as set forth above will be described. When the user turns the ignition switch on, the activation signal IG is input to the ECU 90. Thus, the ECU 90 closes the system main relay 14 and supplies the fuel cell stack 12 with hydrogen and air to initiate operation of the fuel cell system 10.

In the fuel cell system 10, the electric power generation efficiency is improved through intermittent operation in which the operation mode of the fuel cell stack 12 is intermittently switched. For example, the fuel cell system 10 executes an operation control in which the electric power generation command value for the fuel cell stack 12 set to zero, when the fuel cell system 10 operates under a low-load, electric power generation efficiency is low, accordingly. Under these condition, the fuel cell system 10 runs the vehicle and operates the system using an electric power from the battery 74 (hereinafter referred to as "first operation mode"). The fuel cell system 10 may also execute operation control after calculating the electric power generation command value for the fuel cell stack 12 based on an accelerator operation amount, a vehicle speed, and the like, and procures the electric power required to run the vehicle and operate the system either from an electric power generated by the fuel cell stack 12 only or from both the fuel cell stack 12 and the battery 74 (hereinafter referred to as "second operation mode").

However, in either operation mode, the output voltage of the fuel cell stack 12 during normal operation generally ranges between an maximum operating voltage V1 and a minimum operating voltage V2. The maximum operating voltage V1 is, for example, lower than the open circuit voltage of the fuel cell stack 12 and falls within a voltage range in which the platinum catalyst included in the catalytic layers 23a and 24a are not eluted. As described above, the output voltage of the fuel cell stack 12 is controlled to remain equal to or below the maximum operating voltage V1 to prevent the catalyst of the fuel cell stack 12 from deteriorating and will be referred to as "high potential avoidance control". Further, the maximum operating voltage V1 is sometimes referred to as a high potential avoidance voltage. The maximum operating voltage V1 may be set, for example, such that the voltage of each unit fuel cell 20 becomes approximately equal to 90% of a maximum output voltage.

The minimum operating voltage V2 is, for example, falls within a voltage range in which the cell voltage of each unit fuel cell does not fall to a reduction area. If the fuel cell stack 12 is continuously operated in an oxidation area, an oxide layer forms on the surface of the platinum catalyst included in the catalytic layer 24a of the cathode-side electrode 24, and hence the effective area of the platinum catalyst decreases. As a result, the activation voltage is increased, and hence the I-V characteristic of the fuel cell stack 12 deteriorates. By carrying out a catalyst activation treatment to reduce and remove the oxide layer from the platinum catalyst, the I-V characteristic can be recovered. However, if the cell voltage frequently transitions between the oxidation area and the reduction area, the durability of the fuel cell stack 12 decreases. Further, if the cell voltage is lowered to the reduction area and then raised to the oxidation area in response to an increase in required load, the carbon carrying the platinum catalyst may be oxidized. Accordingly, to minimize the reduction in durability of the fuel cell stack 12, the output voltage of the fuel cell stack 12 is controlled during normal operation to a voltage equal to or higher than the minimum operating voltage V2. The minimum operating voltage V2 may be set, for example, such that the voltage of each unit fuel cell 20 becomes approximately equal to 80% of the maximum output voltage.

In the first operation mode, the ECU 90 sets the electric power command value to zero, stops the supply of reactant gases to the fuel cell stack 12, and sets the voltage command value for the DC/DC converter 72 to the maximum operating voltage V1. Even after the supply of reactant gases to the fuel cell stack 12 is stopped, sufficient unreacted hydrogen and oxygen remain in the fuel cell stack 12 to sustain the maximum operating voltage V1 temporarily. Therefore, a small amount of electric power continues to be generated for a while, and the output voltage of the fuel cell stack 12 is maintained at the maximum operating voltage V1.

The electric power generated from the residual reactant is consumed by the auxiliaries 80. If the electric power cannot be entirely consumed by the auxiliaries 80, the excess power is used to charge the battery 74. The residual hydrogen and oxygen in the fuel cell stack 12 are then consumed in generating electric power. Then, due to the decrease in the amount of hydrogen and oxygen, the output voltage of the fuel cell stack 12 cannot be maintained at the maximum operating voltage V1, and the generation of electric power is stopped. Thereafter, the output voltage of the fuel cell stack 12 gradually falls.

When the output voltage of the fuel cell stack 12 falls to the minimum operating voltage V2, the air supply system 30 is driven to supply the fuel cell stack 12 with oxygen (air) to generate electric power. Therefore, the output voltage of the fuel cell stack 12 starts rising. As soon as the output voltage of the fuel cell stack 12 reaches a predetermined voltage, the supply of oxygen is stopped. In this manner, during an electric power generation period using the residual gases, oxidizing gas continues to be supplied to the fuel cell stack 12 each time the output voltage of the fuel cell stack 12 falls to the minimum operating voltage V2. That is, the output voltage of the fuel cell stack 12 maintained at or above the minimum operating voltage V2.

In the second operation mode, the ECU 90 calculates an electric power generation command value in accordance with a required load, controls the supply of hydrogen and air to the fuel cell stack 12, and controls the operation state of the fuel cell stack 12 via the DC/DC converter 72. Under these conditions, the voltage command value for the DC/DC converter 72 is maintained between the maximum operating voltage V1 and the minimum operating voltage V2.

Subsequently, the control for stopping the operation of the fuel cell system 10, which is intermittently operated as described above, will be described. When the user turns the ignition switch off, a command to cancel the activation signal IG, namely, a system operation stop command, is input to the ECU 90 in the fuel cell system 10. In response to this command, the ECU 90 stops driving the air compressor 38 of the air supply system 30 and closes the shutoff valves 42 and 44 to stop the supply of air to the fuel cell stack 12, and also stops operating the circulation pump 60 of the hydrogen supply system 50 and closes the shutoff valves 61, 62, 64, and the like to stop the supply of hydrogen to the fuel cell stack 12. Further, the ECU 90 shuts down the inverter 76 and, for example, stops operating the various pumps and motors included in the on-vehicle auxiliaries to stop the operation of the entire system except the DC/DC converter 72 and the system main relay 14.

When the DC/DC converter 72 and the inverter 76 are shut down and the system main relay 14 is opened as soon as the supply of hydrogen and oxygen to the fuel cell stack 12 is stopped, a small amount of electric power continues to be generated from the residual hydrogen and oxygen in the fuel cell stack 12. As a result, the output voltage of the fuel cell stack rises to the open circuit voltage.

Thus, in the fuel cell system 10 according to this embodiment of the invention, even after the system operation stop command has been received, the DC/DC converter 72 continues to be driven, in order to execute the high potential avoidance control, for a predetermined time.

Figure 3:
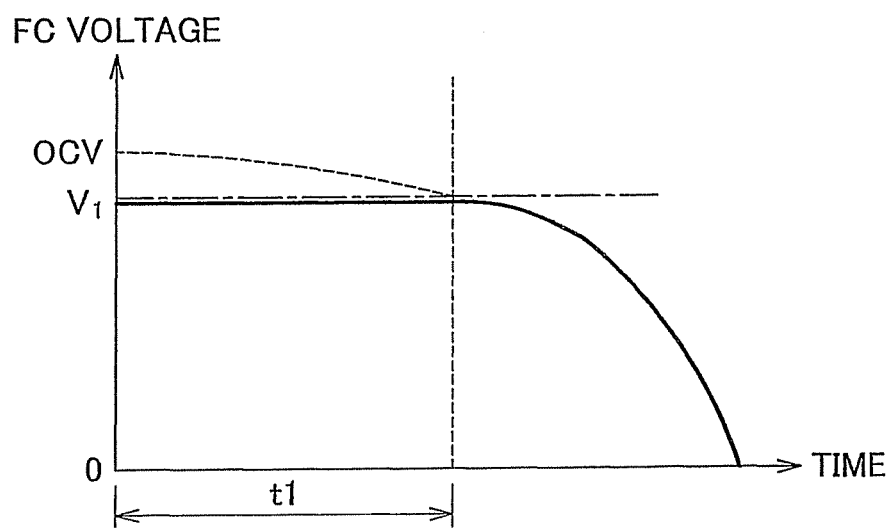
FIG. 3 is a graph showing how an output voltage of a fuel cell changes with time after operation of the system is stopped.

FIG. 3 is a graph showing how the output voltage (the FC voltage) of the fuel cell stack 12 changes after the system operation stop command is issued. The abscissa of this graph represents time, and a time 0 represents the time point at which the system operation stop command is issued.

It should be noted in FIG. 3 that alternate long and short dash lines, indicating the voltage command for the DC/DC converter 72, and a solid line, indicating the FC voltage, are shown slightly offset. This is intended to make it easy to see that the FC voltage is held at the voltage command value of the DC/DC converter 72. In fact, the voltage command for the DC/DC converter 72 and the FC voltage coincide with each other. Further, dotted lines shown in FIG. 3 indicate how the FC voltage changes when the high potential avoidance control is not executed after operation of the system is stopped (the same holds true for FIGS. 4 and 5).

When a system operation stop command is issued, the vehicle is usually stopped or moving at an extremely low-speed so that it is practically stopped. Therefore, the fuel cell stack 12 is controlled in the first operation mode in a low-load range. Thus, the ECU 90 continues to drive the DC/DC converter 72 with the voltage command value for the DC/DC converter 72 maintained at the maximum operating voltage V1. However, even if the voltage command value for the DC/DC converter 72 is not set to the maximum operating voltage V1 when the system operation stop command is issued, the voltage command value is then set to the maximum operating voltage V1. The driving of the DC/DC converter 72 is continued based on the voltage command value.

Even after the supply of hydrogen and oxygen to the fuel cell stack 12 is stopped, a small amount of electric power continues to be generated through an electrochemical reaction of residual hydrogen and oxygen in the fuel cell stack 12. However, the DC/DC converter 72 is driven based on the aforementioned voltage command, and the output voltage of the fuel cell stack 12 is maintained at the maximum operating voltage V1. Then, when the oxygen remaining in the fuel cell stack 12 is consumed through electric power generation and decreases in amount, the output voltage of the fuel cell stack 12 can no longer be maintained at the maximum operating voltage V1. As a result, electric power generation is stopped, and the aforementioned output voltage then starts to decrease from the maximum operating voltage V1.

It should be noted that the battery 74 is charged with the electric power generated and output from the fuel cell stack 12 during this electric power generation period. However, if the battery 74 cannot be charged for the reason of SOC, at least one of the auxiliaries (e.g., the coolant circulation pump and the like) may be driven to consume the electric power.

When it is determined, based on the voltage detected by the voltage sensor 16, that the output voltage of the fuel cell stack 12 has started falling, namely, after a predetermined time t1 has elapsed from when the system operation stop command is input to the ECU 90, the ECU 90 shuts down the DC/DC converter 72 and opens the system main relay 14. Shortly thereafter, the output voltage of the fuel cell stack 12 becomes equal to zero.

As described above, in the fuel cell system 10 according to this embodiment of the invention, the high potential avoidance control is executed for the predetermined time t1 to maintain the output voltage of the fuel cell stack 12 below the maximum operating voltage V1 by continuing to drive the DC/DC converter 72 even after a system operation stop command is input to the ECU 90. Thus, the output voltage of the fuel cell stack 12 is be prevented from rising to the open circuit voltage after operation of the system is stopped, which thereby minimizes deterioration of the catalyst of the fuel cell stack 12.

It should be noted that the predetermined time t1 is described above as a time needed to confirm that the output voltage of the fuel cell stack 12 has started falling based on the voltage detected by the voltage sensor 16. However, the predetermined time t1 is not restricted to such a time. For example, when the supply of oxygen to the fuel cell stack 12 is stopped, the amount of the oxygen remaining in the stack is determined from the volume of the air flow passage in the stack, and the time that is required until the remaining oxygen is consumed, thereby ending the generation of electric power, may be determined in advance through an experiment or the like as a value inherent to the fuel cell stack 12. Accordingly, the ECU 90 may store the predetermined time t1 into the ROM in advance, activate a timer upon receiving a system operation stop command, and for example, shut down the DC/DC converter 72 after the predetermined time t1 has elapsed.

Figure 4:
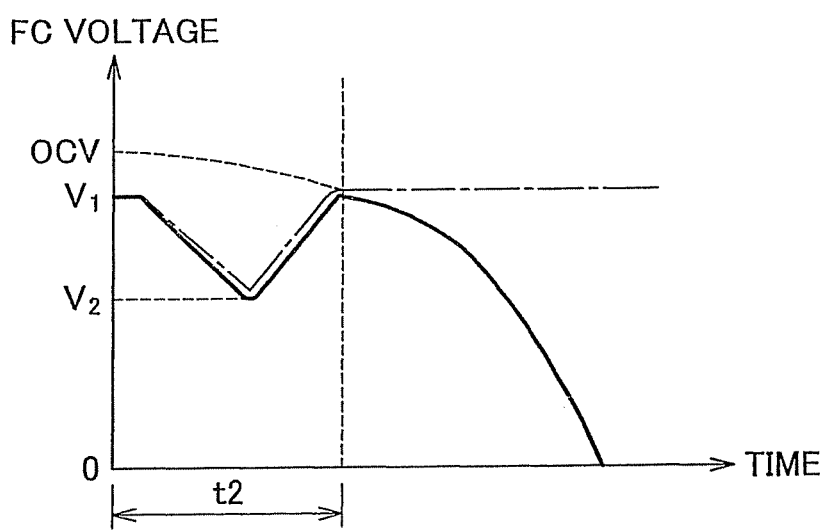
FIG. 4 is another graph showing how the output voltage of the fuel cell changes with time after operation of the system is stopped.

FIG. 4 is a graph showing how the FC voltage changes during another version of high potential avoidance control executed after operation of the system is stopped. In this another version of high potential avoidance control, during the high potential avoidance control after operation of the system is stopped, the ECU 90 lowers the voltage command for the DC/DC converter 72 from the maximum operating voltage V1 (the first value) to the minimum operating voltage V2 (the second value). By thus decreasing the voltage command value for the DC/DC converter 72, electric power generation in the fuel cell stack 12 is promoted. Thus, the consumption of the residual oxygen is accelerated, electric power generation is stopped in a time t2 shorter than the predetermined time t1 shown in FIG. 3, and the time over which the DC/DC converter 72 is driven after the operation of the system is stopped may be reduced. As a result, the time period between when the operation of the system is stopped and when the DC/DC converter 72 is shut down and the system main relay 14 is opened is made as short as possible.

In this case, however, the electric power generated and output from the fuel cell stack 12 may become excessively large for the electric power with which the battery 74 can be charged, and the battery 74 may be damaged. Thus, to avoid this problem, the ECU 90 determines the rate of decreasing the voltage command value from V1 to V2 to avoid situations where the generated electric power exceeds the electric power with which the battery can be charged, and monitors the electric power with which the battery can be charged based on the SOC and an input limit $W_{in}$ of the battery 74. Although the rate of decreasing the voltage command value from V1 to V2 shown in FIG. 4 is constant, the rate of decrease may also be set so that the voltage command value is decreased at a steep gradient and then gradually falls along a gentle curve.

The ECU 90 temporarily decreases the voltage command value for the DC/DC converter 72 to the minimum operating voltage V2, increases the voltage command value to the maximum operating voltage V1, and then stops driving the DC/DC converter 72. The increase in the voltage command value restrains the electric power generated and output from the fuel cell stack 12. Therefore, the rate of increasing the voltage command value may be set so that the voltage command value increases with a steep gradient or vertically (see FIG. 5).

Figure 5:
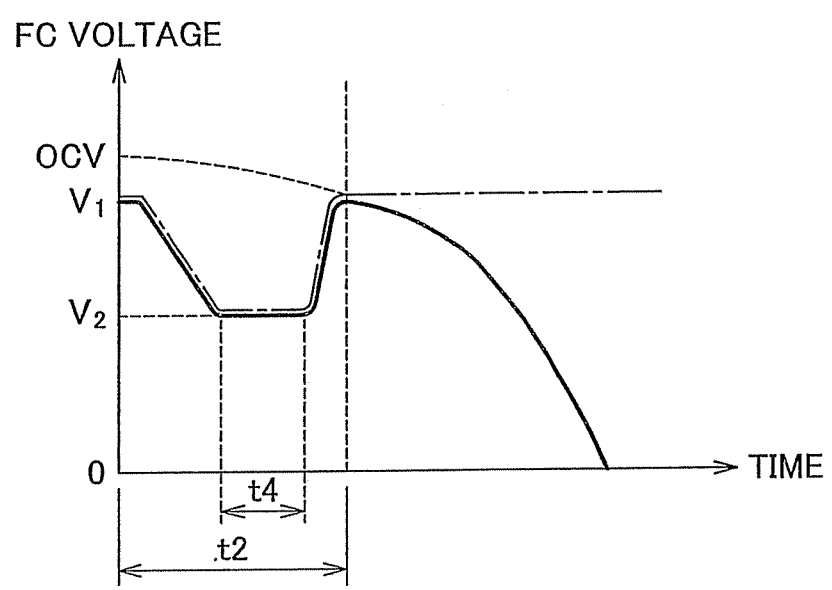
FIG. 5 is still another graph showing how the output voltage of the fuel cell changes with time after operation of the system is stopped.

FIG. 5 is a graph showing how the FC voltage changes during still another version of the high potential avoidance control that is executed after operation of the system has stopped. The high potential avoidance control is similar to the high potential avoidance control shown in FIG. 4 in that the voltage command for the DC/DC converter 72 is temporarily decreased. However, there is a difference between these versions of high potential avoidance control in that while the voltage command value falls and rises, generally along the shape of a triangle in FIG. 4, the voltage command value changes generally along the shape of a trapezoid in FIG. 5, namely, decreases to the voltage value V2, is held at the voltage value V2 for a predetermined time t4, and then returns to the maximum operating voltage V1. In this case, when the voltage value V2 is set within a voltage range of the reduction area of the unit fuel cell, a catalyst activation treatment of removing the oxide layer from the platinum catalyst during the predetermined time t4 may be carried out each time the operation of the system is stopped. Thus, the catalytic function of the fuel cell stack 12 is effectively maintained.

It should be noted that although the fuel cell system in which the fuel cell stack is intermittently operated has been described above, the invention should not be restricted to such a fuel cell system. The invention may also be applied to a fuel cell system in which high potential avoidance control, is performed but intermittent operation is not performed.

Further, in the above embodiment of the invention, the fuel cell system 10 is described as being mounted in the fuel-cell-powered vehicle. However, the fuel cell system according to the invention is not restricted to this use. For example, the fuel cell system according to the invention may be mounted as an electric power supply for a moving object other than the fuel-cell-powered vehicle (a robot, a ship, an aircraft, or the like) or an industrial machine (a construction machine, an agricultural machine, or the like). Alternatively, the fuel cell system according to the invention may be used as an electric power generator (a stationary electric power generation system) for a house, a building, or the like.

The invention claimed is:

1. A fuel cell system characterized by comprising:
    a fuel cell that is supplied with a fuel gas and an oxidizing gas to generate an electric power;
    a DC/DC converter that is electrically connected to the fuel cell; and
    a control unit that controls supply of the fuel gas and the oxidizing gas to the fuel cell and issues a voltage command to and drives the DC/DC converter to execute a high potential avoidance control to restrain an output voltage of the fuel cell from exceeding a high potential avoidance voltage corresponding to the voltage command which is lower than an open circuit voltage, wherein
    the control unit continues to drive the DC/DC converter to execute the high potential avoidance control for a first prescribed time period after the supply of the fuel gas and the oxidizing gas to the fuel cell is stopped in accordance with a system operation stop command;

the control unit performs control of lowering the voltage command for the DC/DC converter from a first value corresponding to the high potential avoidance voltage to a second value while performing the high potential avoidance control after the system operation stop command is input to the control unit; and the control unit increases the voltage command for the DC/DC converter to the first value after reducing the voltage command for the DC/DC converter from the first value to the second value.

2. The fuel cell system according to claim 1, further comprising:

a storage device that is charged with the electric power generated by the fuel cell, wherein the control unit determines a rate of lowering the voltage command for the DC/DC converter from the first value to the second value while monitoring an electric power used to charge the storage device.

3. The fuel cell system according to claim 1, further comprising:

a voltage sensor that detects an output voltage of the fuel cell, wherein the first prescribed time period is set equal to the time between when the system operation stop command is input to the control unit and when a voltage detected by the voltage sensor starts decreasing from the high potential avoidance voltage.

4. The fuel cell system according to claim 1, wherein the first prescribed time period is a preset time that is set equal to the time required until a residual oxidizing gas in the fuel cell is consumed so that the output voltage produced through electric power generation resulting from an electrochemical reaction of the residual oxidizing gas and a residual fuel gas remaining in the fuel cell does not exceed the high potential avoidance voltage after the system operation stop command is input to the control unit.

5. The fuel cell system according to claim 1, wherein the control unit maintains the voltage command for the DC/DC converter at the second value for a second prescribed time period.

6. The fuel cell system according to claim 5, wherein the second value corresponds to a voltage in a reduction area of the fuel cell.

7. A method of controlling a fuel cell system including a fuel cell that is supplied with a fuel gas and an oxidizing gas to generate an electric power; a DC/DC converter that is electrically connected to the fuel cell; and a control unit that controls supply of the fuel gas and the oxidizing gas to the fuel cell, wherein the control unit issues a voltage command to and drives the DC/DC converter to execute a high potential avoidance control to restrain an output voltage of the fuel cell from exceeding a high potential avoidance voltage corresponding to the voltage command which is lower than an open circuit voltage, comprising:

stopping the supply of the fuel gas and the oxidizing gas to the fuel cell when a system operation stop command is input to the control unit; and continuing to drive the DC/DC converter to execute the high potential avoidance control for a first prescribed time period after the system operation stop command is input to the control unit, wherein the voltage command for the DC/DC converter is raised to the first value after performing the control of lowering the voltage command for the DC/DC converter from the first value to the second value.

8. The method according to claim 7, wherein the voltage command for the DC/DC converter is lowered from a first value, corresponding to the high potential avoidance voltage, to a second value when the high potential avoidance control is executed after the system operation stop command is input to the control unit.

9. The method according to claim 7, wherein:

the fuel cell system further includes a storage device that is charged with the electric power generated by the fuel cell; and the voltage command for the DC/DC converter is reduced from the first value to the second value at a rate that is determined while monitoring an electric power used to charge the storage device.

10. The method according to claim 7, wherein:

the fuel cell system further includes a voltage sensor that detects an output voltage of the fuel cell; and the first prescribed time period is set equal to the time between when the system operation stop command is input to the control unit and when a voltage detected by the voltage sensor starts decreasing from the high potential avoidance voltage.

11. The method according to claim 7, wherein the first prescribed time period is a preset time that is set equal to the time required until a residual oxidizing gas in the fuel cell is consumed so that the output voltage produced through electric power generation resulting from an electrochemical reaction of the residual oxidizing gas and a residual fuel gas remaining in the fuel cell does not exceed the high potential avoidance voltage after the inputting of the system operation stop command to the control unit.

12. The method according to claim 7, wherein the voltage command for the DC/DC converter is maintained at the second value for a second predetermined time period.

* * * * *

UNITED STATES PATENT AND TRADEMARK OFFICE
CERTIFICATE OF CORRECTION

| | | |
|---|---|---|
| PATENT NO. | : 8,415,065 B2 | Page 1 of 1 |
| APPLICATION NO. | : 13/321722 | |
| DATED | : April 9, 2013 | |
| INVENTOR(S) | : Yoshida | |

It is certified that error appears in the above-identified patent and that said Letters Patent is hereby corrected as shown below:

In the Specification:

In the section entitled Detailed Description of Embodiment, at column 4, line 50:
Delete "a fuel as" and insert therefor --a fuel gas--;

at column 9, line 54:
Delete "fuel cell system. 10" and insert therefor --fuel cell system 10--;

at column 11, line 13:
Delete "is be prevented" and insert therefor --is being prevented--;

In the Claims, at column 12, claim 1, line 50:
Delete "A fuel cell system characterized by comprising:" and insert therefor --A fuel cell system comprising:--.

Signed and Sealed this
Thirteenth Day of August, 2013

Teresa Stanek Rea
*Acting Director of the United States Patent and Trademark Office*